United States Patent [19]

Bernstein

[11] Patent Number: 4,641,579

[45] Date of Patent: Feb. 10, 1987

[54] PRINTING FOUNTAIN SOLUTION

[75] Inventor: Irwin B. Bernstein, Homewood, Ill.

[73] Assignee: R. R. Donnelley & Sons Company, Chicago, Ill.

[21] Appl. No.: 677,206

[22] Filed: Nov. 21, 1984

Related U.S. Application Data

[63] Continuation-in-part of Ser. No. 377,978, May 13, 1982, abandoned.

[51] Int. Cl.[4] .................................... C09D 5/20

[52] U.S. Cl. .................................... 101/451; 106/2

[58] Field of Search .................................... 106/2; 101/45

[56] References Cited

U.S. PATENT DOCUMENTS

| | | | |
|---|---|---|---|
| 3,547,632 | 12/1970 | Nadeau | 96/33 |
| 3,745,028 | 7/1973 | Rauner | 106/2 |
| 4,186,250 | 1/1980 | Garrett, et al. | 96/33 |
| 4,200,688 | 4/1980 | Garrett, et al. | 430/302 |

OTHER PUBLICATIONS

"Trends in Litho Dampening Systems Show Vast Improvements in Designs", by John MacPhee, Graphic Arts Monthly, Apr. 1981, pp. 35–42.

*Primary Examiner*—Lorenzo B. Hayes
*Attorney, Agent, or Firm*—Fitch, Even, Tabin & Flannery

[57] ABSTRACT

An improved fountain solution and viscosity control thereof is disclosed for lithographic printing using dampening systems of the continuous type, such as a Dahlgren system. The fountain solution utilizes a viscosity imparting or thickening agent for viscosity control, such as hydroxypropylmethyl cellulose, to effect a desired viscosity. A thickened solution is prepared, and this solution is added to an aqueous solution including an ionic etch to provide a fountain solution having a viscosity of between about 20 seconds and about 22 seconds as measured in a #1 Shell cup.

19 Claims, No Drawings

PRINTING FOUNTAIN SOLUTION

This is a continuation-in-part application of Ser. No. 377,978 filed May 13, 1982 now abandoned.

The present invention generally relates to fountain solutions used to maintain desensitivation of non-image areas in lithographic printing, and more particularly relates to the viscosity control of such solutions for dampening systems of the continuous inker-feed type.

BACKGROUND OF THE INVENTION

Herein, "printing" refers to any lithographic printing process in which an image is transferred to an image-receptive surface, directly or indirectly, from a plate having hydrophobic, ink-receptive image areas and hydrophilic, ink-repellant non-image areas. This invention particularly relates to fountain solutions and the viscosity control thereof for printing.

Printing plates are prepared by various methods known in the art, e.g., by photoimaging, to produce image and non-image areas on the plate, and the plate is processed so that the image areas are hydrophobic whereas the non-image areas are hydrophilic. When a printing ink is applied to the prepared plate, the ink adheres only to the hydrophobic or image areas.

In high speed printing processes, such as web offset printing, a printing plate is on a rotating cylinder, and the plate is inked on each rotation of the cylinder prior to transfer of the image from the plate either directly to an image-receptive surface or to an image-transferring roller. In order that the image be clearly produced throughout an extended printing run, it is necessary that a clear demarcation be maintained between the hydrophilic or non-image areas and the hydrophobic or image areas. To this end, a dampening system is provided to apply a fountain solution to the plates on each rotation of the cylinder. The fountain solution adheres to the hydrophilic or non-image portions of the plate but does not extend to the hydrophobic portions. The ink, on the other hand, adheres only to the image areas. Various dampening systems are known but a common dampening system is that provided by the Dahlgren Manufacturing Company that is the standard for inker-feed type systems. In this dampening system, the fountain solution is continuously metered onto an ink form roll which, in turn, applies ink and fountain solution simultaneously to the plate. This dampening system and other continuous dampening systems are to be distinguished from the various plate-feed type dampening systems in which the fountain solution is metered onto the plate by means of a ductor roll, brush or spray, and the ink is subsequently applied to the plate.

Advantages of a continuous dampening system including an inker-feed dampener are many. They include reduced sensitivity to upsets, ease of operation and control, improved ink and water balance, reduced waste and spoilage, rapid plate cleanup on startup, and improved print quality.

Successful printing depends on the application of ink and fountain solution to the plate in a manner which results in even distribution of the ink over the image areas and absence of ink in the non-image areas. To this end, a fountain solution should not emulsify the ink, although a small amount of emulsification of aqueous fountain solution in the ink is generally unavoidable and is considered acceptable. The fountain solution should, of course, be unreactive with the ink and should not promote instability of the ink. Further, the fountain solution should have such characteristics as to spread evenly and in sufficient amount on the dampening rolls. Successful printing also depends upon precise regulation of the amount and rate of ink and fountain solution applied.

In order to maintain the hydrophilicity of the non-image areas of the plate, fountain solutions are ionic and typically contain magnesium, phosphate, chromium and nitrate ions, as well as natural or synthetic gum arabic Generally, fountain solutions are acidic, although in some cases they may be basic. They are generally prepared by dilution with water of a concentrate, or etch, containing the gum arabic and ionic components.

The continuous type dampening system is subject to control problems, capacity limitations and streaking which have been alleviated by including substantial amounts of isopropyl alcohol in the fountain solution to assist the transport of the fountain solution to the printing plates in a lithographic printing process. This alcohol addition was known to reduce surface tension of the fountain solution and historically it was generally believed to thereby provide improved results in the dampening systems. While not intending to be bound by any particular theory, Applicant believes isopropyl alcohol probably does reduce the surface tension of a fountain solution. But what makes the continuous dampening or Dahlgren system properly function, however, is the alcohol controlling the viscosity of the fountain solution in such systems.

While isopropyl alcohol used at about a 25% by volume level to provide a #1 Shell cup viscosity of 22 seconds at about 70° F. has proved effective in fountain solutions for continuous dampening systems, it also has disadvantages, particularly with respect to environmental concerns, which make a suitable replacement for isopropyl alcohol highly desirable. This somewhat volatile alcohol poses the problems of increased cost, undesirable fumes for workers, fire hazards and environmental disposal problems. Furthermore, evaporation of the alcohol presents a problem of maintaining consistency of the fountain solution. As printing temperatures increase isopropyl alcohol evaporates. Hence, consistently holding a viscosity without adding additional amounts of isopropyl alcohol becomes a problem. Without refrigeration, alcohol loss and viscosity control both suffer, with resulting problems of quality and waste.

For a continuous dampening system to be regarded as acceptable the fountain solution should have a #1 Shell cup viscosity of at least about 20 seconds at printing temperatures and preferably be in the range of 21 to 22 seconds. These viscosities are attained by isopropyl alcohol concentrations above 10% by volume, and preferably 20% to 25% by volume isopropyl alcohol, at 70° F. As shown in Table I, a substantial amount of isopropyl alcohol is required to build the fountain solution to a viscosity of an acceptable level.

TABLE I

VISCOSITIES OF FOUNTAIN SOLUTIONS WITH VARYING AMOUNTS OF ISOPROPYL ALCOHOL AT 70° F.

| % Isopropyl Alcohol By Volume | Viscosity In Seconds |
|---|---|
| 1 | 18.0 |
| 2 | 18.4 |
| 5 | 19.3 |
| 10 | 20.1 |
| 20 | 22.0 |
| 25 | 22.2 |

Once the viscosity of a fountain solution starts falling below 20 seconds, as measured in a Shell #1 cup, the following problems result when using a continuous dampening system: reduced capacity, difficult control of ink and water balance, streaking, increased waste and spoilage, scumming and difficult startup.

Moreover the problem of holding a viscosity with isopropyl alcohol evaporating at elevated printing temperatures compounds the printer's problems such that expensive refrigeration has been used so as to reduce alcohol loss. In view of all of the aforedescribed problems, the industry has searched for substitutes for isopropyl alcohol.

As a substitute for isopropyl alcohol in fountain solutions, many substances have been tried. These substitutes, however, have generally not provided results comparable with isopropyl alcohol despite their providing equivalent surface tension properties. Surfactants have been tried in lieu of isopropyl alcohol. Surfactants, however, often cause foaming, undue criticality in dampening systems operations, reduced printing speeds and dispersal of ink. Generally, fountain solutions with isopropyl alcohol substitutes, such as surfactants, are considerably less satisfactory than those with isopropyl alcohol and require mechanical changes in printing and dampening apparatus.

U.S. Pat. Nos. 4,186,250 and 4,200,688 to Garrett et al. describe polymeric substitutes for natural gum arabic, a substance used in a number of printing formulations, such as developer, straight gum solutions and gum etch solutions. Fountain solutions for dampening systems in lithographic printing usually include gum arabic or a substitute. The gum arabic substitute, disclosed in these patents, has a polymer component that is a polyacrylamide-polyacrylic acid composition that may include up to about 30 percent by weight hydroxypropylmethyl cellulose to enhance the substitution of the composition for gum arabic.

Although the '688 and '250 patents to Garrett et al. describe fountain solutions, these fountain solutions are not described as being used in conjunction with continuous inker-feed dampening systems. For example, the fountain solutions of examples 21 and 36 of the '688 and '250 patent exhibit viscosities of 19.4 and 18 seconds, respectively, at 70° F. As a result, they are not acceptable for fountain solutions for use in a continuous dampening system. Moreover, both the '688 and '250 patents to Garrett et al. recognize the heretofore required use of isopropyl alcohol in a fountain solution in a continuous inker-feed or Dahlgren type dampening system.

It is a main object of the invention to provide a fountain solution useful in continuous dampening systems for lithographic printing which does not use isopropyl alcohol, yet produces the same high-quality results and dampener operating characteristics obtained with isopropyl alcohol-containing fountain solutions.

A more particular object is to provide a viscosity controlled fountain solution for use in a continuous dampening system which does not include isopropyl alcohol.

Another object of this invention is to provide an improved fountain solution which is substantially free of surfactants or foamers for use in the operation of a continuous dampening system.

Another object is to provide a viscosity controlled fountain solution for use in a continuous feed dampener which can be compensated for the effect of increasing temperature without the use of refrigeration.

SUMMARY OF THE INVENTION

In accordance with the invention and consistent with the goals and objects of fountain solutions described herein, an improved aqueous fountain solution for lithographic printing which solution is substantially free of isopropyl alcohol is provided. The aqueous fountain solution contains a viscosity imparting agent, or thickening agent, selected from the group consisting of hydroxypropylmethyl cellulose, polyalkylene glycol, polyvinyl pyrrolidone or polyacrylamide, or mixtures thereof, in an amount to provide a fountain solution having a viscosity of at least about 20 seconds to 22 seconds and most preferably between about 21 to 22 seconds at press temperatures as measured in a #1 Shell cup; and between about 1 and about 5 percent by volume of a commercially available ionic etch. The fountain solution may desirably contain up to about 5 percent by volume of an ethylene glycol monobutyl ether.

The viscosity-imparting agent is initially prepared as a thickening solution comprising a small amount of the agent, the agent being initially dissolved at higher concentration in hot water and then brought to desired viscosity with water at ambient temperature. The thickened solution is admixed with water, etch and other additives before use as a fountain solution. Alternatively, the viscosity imparting agent may be dissolved in the ethylene glycol-ether with water at ambient temperature and then added to the solution. The thickening agents contemplated include hydroxypropylmethyl cellulose having a molecular weight of about 90,000, such as that sold under the trademark Methocel F4M; polyvinyl pyrrolidone having a molecular weight in the range of about 360,000 to about 40,000, such as those sold as NPK 90 and NPK 30; by a polyacrylamide having a molecular weight in the range of about 5 million to about 6 million, such as Cyanamer P250 sold by American Cyamamid; and a polyalkylene glycol having a molecular weight of about 15,000, such as UCON 75 H-9000 sold by Union Carbide. While some of the suitable thickening agents may be relatively costly, they are highly desirable in lieu of isopropyl alcohol if at low concentrations they provide the fountain solution with the requisite viscosities that are needed in printing operations using a continuous dampening system.

In accordance with the present invention, the improved aqueous isopropyl alcohol-free fountain solution contains a small amount of thickening agent to effect the desired viscosity and viscosity control, plus an amount of ionic etch sufficient for maintaining the hydrophilicity of non-image areas of printing plates. Moreover, all of this is done with a fountain solution which is free or substantially free of surfactants. The fountain solution containing the small amount of thickening agent provides a #1 Shell cup viscosity of at least about 20 seconds at 70° F. or other suitable printing temperature which is like those obtained with a fountain solution containing substantial amounts of isopropyl alcohol. The thickening agents are non-volatile and thus do not cause problems in the print shop. The amount of thickening agent used to obtain a desired viscosity is far less than the amount of isopropyl alcohol required to achieve a comparable viscosity and thus minimizes disposal problems. In fact, the thickening agent will be present normally at substantially less than 10 percent of the amount of isopropyl alcohol and even less than 1 percent of the amount of alcohol. Whereas an inherent problem with volatile alcohol is that at printing temperatures evaporation of alcohol results in viscosity fluctuations, the non-volatile nature of the thickening agents useful in the invention avoids the difficulty in maintaining uniform concentrations and viscosities. With the use of the thickening agent and the viscosity control facilitated thereby, the feed rate of the fountain solution from its source to the printing plates is controlled.

Hydroxypropylmethyl cellulose (HPMC), such as that sold under the tradename Methocel F4M by Dow Chemical Co., forms a clear fluid when dissolved in hot water. HPMC is prepared as an aqueous fluid and added to the ion-providing components of the fountain solution a short time prior to use of the fountain solution. Dry HPMC may be dissolved in hot water, and when the solution cools, a thickened solution results. The thickened solution may be rapidly prepared by dissolving the HPMC in a small volume of hot water and then bringing the hot solution to desired concentration with cold water. As indicated above, the HPMC may be initially dissolved in an ethylene glycol ether, such as Butyl Cellosolve solvent which is available on the commercial market from Union Carbide Corporation. Preferably, the thickened solution is made to comprise between about 2 and about 3 weight percent of HPMC, the solution at these concentrations having a fluidity such that it can be pumped through a conduit for mixing with a water-etch composition before use in the fountain solution in printing. The thickened solution can be stable for several weeks or can be prepared shortly before use.

A printing system in which a viscosity imparting agent is used typically has a tank containing the thickened solution and a reservoir containing water and etch. The solution and water-etch solution are individually pumped to a mixing chamber to yield the fountain solution. From the mixing chamber, the fountain solution is pumped to a reservoir associated with a wetting roll of the dampening system, and the roll conducts the fountain solution onto the ink roll after metering.

By adding the thickened solution to the water-etch composition shortly before printing, the viscosity of the fountain solution may be continuously or periodically monitored and adjusted by control of the amount of thickened solution added. The viscosity of the fountain solution is adjusted at about 70° F. to at least about 20 seconds as measured in a #1 Shell cup with a final concentration of thickening agent between about .04 and about 1.3 weight percent in the fountain solution depending upon the thickening agent used. Preferably, the viscosity of the fountain solution at about 70° F. is between about 21 seconds and about 22 seconds as measured in the #1 Shell cup. At higher temperatures of operation of the dampening system, the amount of thickening agent can be increased to maintain such desired viscosity. This control of viscosity with the thickening agent and by adjustment of the amount of thickening agent in solution at higher press temperatures avoids the need of refrigeration and provides better press operations. In other words, the adjustment of viscosity can be effected without controlling the temperature of the fountain solution.

The operation of presses and the atmospheric temperature will affect the printing temperatures and temperatures of the fountain solution. Although printing temperatures may vary considerably, typically printing temperatures will be in the range of from about 65° F. to about 100° F.

An important requirement for the thickening agent is that it does not severely break down the printing ink. Such breakdown impairs the utility of the thickening agent, but slight breakdown of ink can be accepted. To test the acceptability of the fountain solution containing the thickening agent, the following test procedure can be used.

Place 20 gm. of ink in a 250 ml. plastic beaker, and add 100 ml. of fountain solution, containing the composition to be tested. Place a tight cap on the beaker.

Shake the beaker on a Red Devil paint shaker for 30 seconds. After shaking, pour the fountain solution into a 50 ml. beaker for evaluation. Report breakdown of the ink as slight, moderate or severe. A slight breakdown will be evidenced by a thin crust of ink on the liquid's surface and by a few specks of ink on the walls of the container. A severe breakdown will be evidenced by a thick crust of floating ink, by a marked opacity in the solution that is caused by many fine droplets of dispersed ink, and by a film of ink on the container walls.

The etch solution for the fountain solution is generally a commercially available composition and is an ionic solution which maintains the hydrophilicity of the non-image regions of the plate to maintain a clear demarcation between the image and non-image regions. The etch solution typically contains salts, which provide phosphate, nitrate, chromium and magnesium ions; and natural gum arabic or a substitute therefore. The etch solution is generally acidic, and sufficient etch is added to adjust the pH of the fountain solution to below 6.0 and in some cases as low as 3.0. Typically, the pH of the fountain solution is adjusted to between 4.0 and 4.5. The commercial etch solutions are in the fountain solutions in an amount of between about 1.5 to about 3 volume percent to provide the desired gum arabic concentration, pH and ionic strength. A variety of suitable commercially available etches for use in preparing fountain solutions according to this invention include those sold under the trademarks G7AV by Rosos Chemical Companies and Rycoline Blue Chip sold by Rycoline Products, Inc.

It is found that printing results may be improved when ethylene glycol monobutyl ether is included in the fountain solution in conjunction with the thickening agent. The ethylene glycol ether may comprise up to about 5 volume percent of the fountain solution. Liquid ethylene glycol monobutyl ether may be added directly to the water-etch solution or may be codissolved with the thickening agent provided that precipitation does not occur.

Other known additives may be included in the fountain solution.

Fountain solutions, according to the present invention, can be formulated for running with most commercial printing inks. It is preferred that, when using a fountain solution containing a thickening agent of the invention, a commercial ink specifically formulated to run with alcohol substitute fountain solutions be used. Such inks are sold by Napic, Inmont, GPI, Sinclair & Valentine, Flint and others.

EXAMPLE I 3.35 ounces of HPMC (Methocel F4M) is added to one quart of water at 200° F. and dissolved therein, and the resulting solution is brought up to one gallon with distilled cold water achieving a clear thickening solution comprising 2.5 weight percent HPMC.

A fountain solution is prepared by first making a solution containing 2.5 fluid ounces of etch, 2 fluid ounces of Butyl Cellosolve and 96 fluid ounces of water. 3.5 ounces of the thickened solution is added to water-etch-Butyl Cellosolve solution and water is added to provide a volume of one gallon. The dilution is first accomplished by prediluting the thickened solution with an equal volume of the water-etch-Butyl Cellosolve solution, a procedure which facilitates dispersion of the thickened solution. The fountain solution had a viscosity of 20.8 seconds at 70° F. Thickened solution may be added to maintain the viscosity, as desired, at higher printing temperatures. The fountain solution, which contains about 0.068 percent by weight HPMC, is clear and free of undissolved or suspended solids.

The fountain solution was successfully used as a substitute for isopropyl alcohol-containing fountain solution in a web offset press using a continuous inker-feed dampening system. No changes were required in dampener settings when switching from alcohol-containing fountain solution.

EXAMPLE II

A commercially used red ink was tested in the fountain solution of Example I and a comparable fountain solution containing 20% isopropyl alcohol. Comparisons were made to test the compatibility of the solution with the ink, and the results are shown in the table below along with the results of using other viscosity imparting agents.

TABLE II

| | FOUNTAIN SOLUTIONS | | | |
|---|---|---|---|---|
| Viscosity-Impartive Agent* | Conc. In Fountain Solution | Solution Clarity | Solids Precip-itate | Ink Bleed (Shake) |
| Isopropyl Alcohol | 20.0% | CLEAR | NO | MODERATE |
| F4M-HPMC | .07% | CLEAR | NO | LIGHT |
| NPK 90 | .23% | HAZY | NO | MODERATE |
| NPK 30 | 1.875% | HAZY | NO | MODERATE |
| Cyanamer P 250 | .12% | SL. HAZE | NO | LIGHT |
| UCON 75H 9000 | 1.2% | CLEAR | NO | MODERATE |

*Viscosity imparting agent sufficient to impart a 21 seconds to 22 seconds viscosity in a Shell #1 cup at 70° F.

It can be seen from Table II that the thickening agents compare favorably with the isopropyl alcohol with respect to ink compatibility. It should also be noted that various of the thickening agents cost considerably less than isopropyl alcohol when effectively used in fountain solutions.

EXAMPLE III

A thickened solution of the invention is prepared by mixing 1.5 fluid ounces of UCON 75H-9000, a polyalkylene glycol having a molecular weight of 15,000, with 4 fluid ounces of water at about 50° C.; and then mixing with 2.5 fluid ounces of ethylene glycol monobutyl ether. A solution of 2.5 fluid ounces of etch in three quarts of water is prepared and the thickened solution is added along with cold water to provide one gallon of fountain solution containing 1.17 percent by volume of the UCON having a viscosity of 21 seconds at 70° F.

EXAMPLE IV

Another thickened solution of the invention is prepared by mixing 10 percent by weight of NPK 90, polyvinyl pyrrolidone, with water at 90 percent by weight. Another solution comprising 2.5 fluid ounces of etch in 3 quarts of water is prepared, and 2.5 fluid ounces of ethylene glycol monobutyl ether is mixed in. Three fluid ounces of the thickened solution is added to the etch solution, and this mixture is diluted to one gallon with water. The resulting fountain solution comprises 0.23 percent by weight of the thickening agent.

The advantages of the fountain solutions of the present invention may now be more fully appreciated. The fountain solution avoids environmental problems associated with isopropyl alcohol while producing printing results and dampener feed rates as good as those achieved with isopropyl alcohol-containing fountain solutions. A substantial reduction in fountain solution cost can be achieved as well. Unlike many previously used isopropyl alcohol substitutes such as foaming surfactants, there is no difficulty in achieving the desired control, and feed rate, and hence, printing apparatus need not be modified. Whereas surfactants as isopropyl alcohol substitutes when used in fountain solutions have caused foaming, no such problem is encountered with the thickening agents of the invention.

While the invention has been described in terms of a preferred embodiment, modifications obvious to one with ordinary skill in the art may be made without departing from the scope of this invention.

Various features of the invention are set forth in the following claims.

What is claim is:

1. A method of practicing a lithographic printing process which includes a continuous dampening system, said method comprising the steps of preparing an aqueous fountain solution for maintaining desensitivity of printing plates, applying said fountain solution and an ink by a continuous dampening system to a lithographic plate and tranferrring an image from the plate to a surface, the improvement comprising preparing a thickened solution free of isopropyl alcohol the thickened solution comprising a thickening agent selected from the group consisting of hydroxypropylmethyl cellulose, polyvinyl pyrrolidone, polyacrylamide, polyalkylene glycol, or mixtures thereof and mixing said thickened solution with said fountain solution in an amount to provide the fountain solution with a viscosity of between about 20 seconds and about 22 seconds as measured by a Shell #1 cup at printing temperatures, thereby providing an alcohol-free, viscosity controlled fountain solution.

2. A method of practicing a lithographic printing process as recited in claim 1 wherein the amount of thickening agent provides a #1 Shell cup viscosity between about 21 seconds and about 22 seconds.

3. A method of practicing a lithographic printing process as recited in claim 1 wherein the fountain solution further includes ethylene glycol monobutyl ether.

4. A method of practicing a lithographic printing process as recited in claim 1 wherein the thickening agent is hydroxypropylmethyl cellulose.

5. A method of practicing a lithographic printing process as recited in claim 1 wherein the thickening agent is polyalkylene glycol having a molecular weight of about 15,000.

6. A method of practicing a lithographic process as recited in claim 1 wherein said fountain solution is substantially free of surfactants.

7. A method of practicing a lithographic printing process in accordance with claim 1 wherein the amount of thickening agent provides a viscosity between about 21 seconds and about 22 seconds at 70° F.

8. A method of practicing a lithographic process as recited in claim 2 wherein the thickening agent is hydroxypropylmethyl cellulose.

9. A method of practicing a lithographic process as recited in claim 2 wherein said fountain solution is substantially free of surfactants.

10. A method of practicing a lithographic process as recited in claim 4 wherein said fountain solution is substantially free of surfactants.

11. In a method of lithographic printing which includes a continuous dampening system comprising an aqueous fountain solution for maintaining desensitivity of printing plates, the improvement comprising the step of controlling the viscosity of an isopropyl alcohol-free aqueous fountain solution within the range between about 20 seconds and about 22 seconds as measured by a Shell #1 cup at printing temperatures by mixing with said fountain solution a thickening agent selected from the group consisting of hydroxypropylmethyl cellulose, polyvinyl pyrrolidone, polyacrylamide, polyalkylene glycol, or mixtures thereof.

12. A method of lithographic printing as recited in claim 11 wherein the amount of thickening agent provides a Shell #1 cup viscosity between about 21 seconds and about 22 seconds.

13. A method of lithographic printing as recited in claim 11 wherein the fountain solution further includes ethylene glycol monobutyl ether.

14. A method of lithographic printing as recited in claim 11 wherein the thickening agent is hydroxylpropylmethyl cellulose.

15. A method of lithographic printing as recited in claim 11 wherein said fountain solution is substantially free of surfactants.

16. A method of lithographic printing as recited in claim 11 wherein the amount of thickening agent provides a viscosity between about 21 seconds and 22 seconds at 70 F.

17. A method of lithographic printing as recited in claim 12 wherein said thickening agent is hydroxypropylmethyl cellulose.

18. A method of lithographic printing as recited in claim 12 wherein said fountain solution is substantially free of surfactants.

19. A method of lithographic printing as recited in claim 17 wherein said fountain solution is substantially free of surfactants.

* * * * *